March 31, 1964   F. PLASSER ETAL   3,126,633
METHOD AND APPARATUS FOR MEASURING THE HEIGHT OF
THE ARC OF A CURVED TRACK SECTION
Filed May 31, 1960                    2 Sheets-Sheet 1
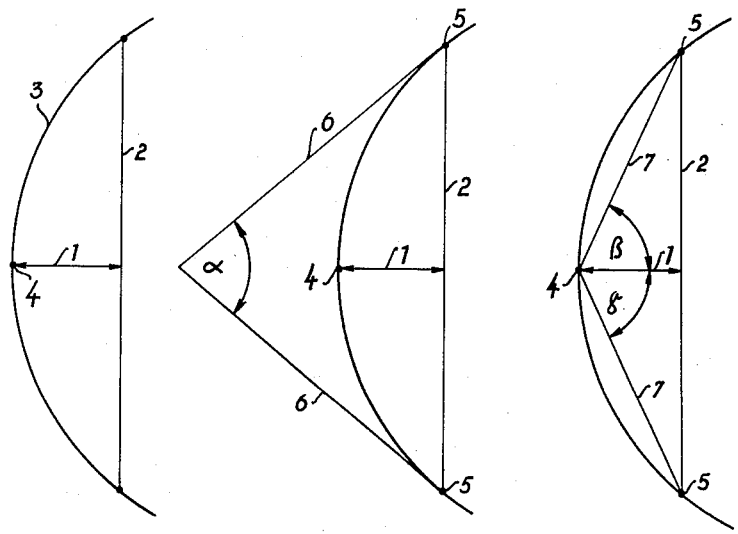
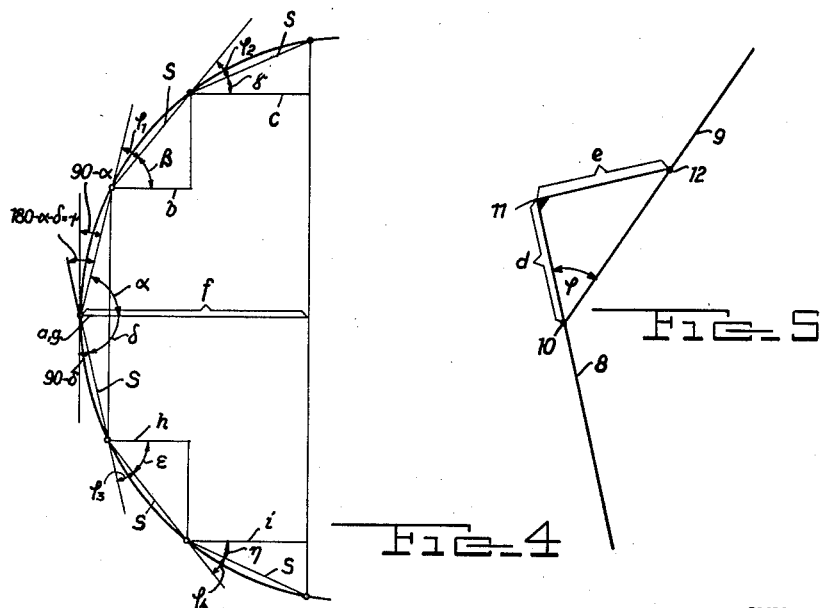
INVENTORS
FRANZ PLASSER
JOSEF THEURER
EGON SCHUBERT
BY
AGENT

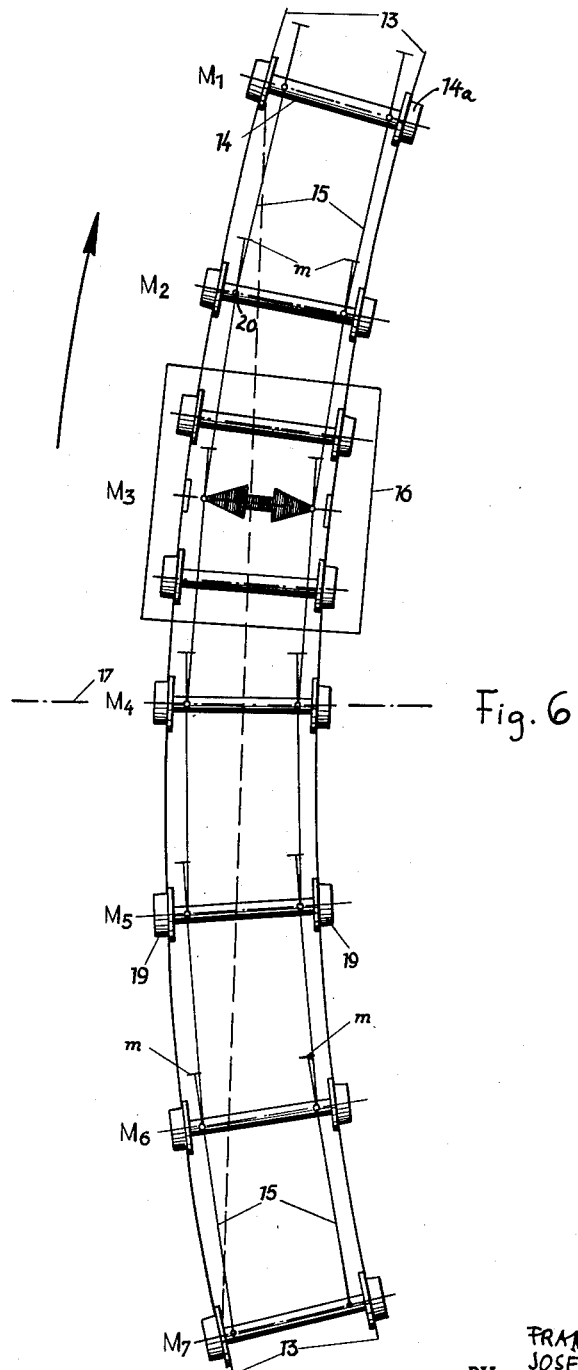

United States Patent Office 3,126,633
Patented Mar. 31, 1964

3,126,633
METHOD AND APPARATUS FOR MEASURING THE HEIGHT OF THE ARC OF A CURVED TRACK SECTION
Franz Plasser and Josef Theurer, both of Johannesgasse 3, and Egon Schubert, Sturzgasse 17, all of Vienna, Austria
Filed May 31, 1960, Ser. No. 32,831
2 Claims. (Cl. 33—1)

The present invention relates to methods for the alignment of a track within a curved track section, particularly arcs, as well as straight sections which may be considered as arcs with infinitely large radii. More particularly, this invention is concerned with a method and apparatus for measuring the height of the arc of a track section.

It is the primary object of the invention considerably to simplify the measurement of the arc height of a track section.

It is a more particular object of the invention to automatize such measurements in an operation continuously proceeding along a track section and thus to synchronize the measurements with the operation of a track aligning machine.

These and other objects are accomplished in accordance with this invention by extending a series of adjacent chordal elements within the track section to be corrected to obtain a series of reference points where the adjacent chordal elements meet, measuring the angles enclosed by adjacent chordal elements at successive reference points (or the angles between extensions of the chordal elements beyond the reference point and the adjacent chordal element and calculating the height of the arc of the entire track section on the basis of the measured angles or their tangents.

For the calculation of the arc height, use may advantageously be made of the fact that double the arc height of a track section is proportional to the sum of the tangents of all angles enclosed between the adjacent chords or their extensions. Therefore, according to a preferred embodiment of the invention, the angles or their tangents are measured at successive reference points and the height of the arc is calculated from the sum of the tangents of all the measured angles.

According to another preferred feature, the angles, preferably their tangents, are electrically measured and the thus obtained electrical pulse is used to produce the desired direction of track alignment.

The present invention also provides an apparatus for practicing the measuring method, such apparatus comprising a plurality of spaced axles with wheels for mobility on the track, a reference point on each axle, means, such as rods, for coupling the axles to each other, preferably at the reference points so that the rods constitute chordal elements between adjacent axles, and means for measuring the angles enclosed by adjacent chordal elements. The coupling rods are pivotally connected to the axles and preferably have extensions beyond the reference points so that the angles may be measured between the extension and adjacent rods, the measuring means being preferably electrically actuated. It is also possible, however, to measure the angle between the coupling rods and the axles themselves. The electrical measuring means is known per se and may be a resistance including a sliding contact or brush.

The above and other features of the invention will be more fully understood with reference to the following detailed description of a specific embodiment illustrated in the accompanying drawing wherein FIGS. 1 to 3 schematically show conventional methods for measuring the arc height;

FIGS. 4 and 5 schematically show the principles upon which the present invention is based; and FIG. 6 schematically illustrates an apparatus useful for carrying out the measuring method.

Referring now to the drawing, wherein like reference numerals indicate like parts, FIG. 1 shows how the height 1 of the arc 3 between chord 2 and point 4 may be simply measured by extending a taut cord or wire between the chord and point 4, and then measuring the length of the cord or wire.

In the method of FIG. 2, this measurement has been accomplished by establishing tangents through end points 5 of the chord 2 and then measuring the angle $\alpha$ between the tangents, this angle being used to calculate the height 1 of the arc, the length of chord 2 being known.

In FIG. 3, angles $\beta$ and $\gamma$ between straight lines 7 and the height 1 of the arc are measured and the arc height is then calculated on the basis of these angles and the known length of chord 2.

The method of the present invention is based on the following considerations, reference being had to FIG. 4. As will be appreciated from an inspection of this figure, double the height $f$ of the arc is equal to the sum of the distances $a$, $b$, $c$, $g$, $h$ and $i$.

$$2f = s \{\cos \alpha + \cos (\alpha - \varphi_1) + \cos (\alpha - \varphi_1 - \varphi_2) + \cos \delta + \cos (\delta - \varphi_3) + \cos (\delta - \varphi_3 - \varphi_4)\}$$

Since the radii of curved track sections are in excess of 150 m. and since the reference points where the chords $s$ meet are no more than about 5 m. apart, the angles $\varphi_1$, $\varphi_2$, $\varphi_3$ and $\varphi_4$ are very small and $\alpha$ and $\delta$ are close to 90°. Since the number of chords or reference points is also relatively small, the sum of the angles $\varphi$ may also be considered as very small.

For the given example (arc radius 150 m., $s=5$ m.), the angles $\varphi$ are each about 2° and the angles $\alpha$ and $\delta$ are $90 - 2 = 88°$.

If the following approximation is used (which is sufficiently accurate)

$$\cos (\alpha - \varphi_1) = \cos \alpha + tg\varphi_1$$
$$\cos (\alpha - \varphi_1 - \varphi_2) = \cos \alpha + tg\varphi_1 + tg\varphi_2$$
$$\cos (\delta - \varphi_3) = \cos \delta + tg\varphi_3$$
$$\cos (\delta - \varphi_3 - \varphi_4) = \cos \delta + tg\varphi_3 + tg\varphi_4$$

the last equation gives the following result:

$$\cos (\delta - \varphi_3 - \varphi_4) = \cos (88° - 2° - 2°) = \cos 84°$$
$$= 0.10453$$
$$\cos \delta + tg\varphi_3 + tg\varphi_4 = \cos 88° + tg2° + tg2°$$
$$= 0.03492 + 2 \cdot 0.03492$$
$$= 0.10476$$

The total error is only 2.3 per thousand.
With this approximation, $$f = \frac{s}{2}.(\cos \alpha + \cos \alpha + tg\varphi_1 + \cos \alpha + tg\varphi_1 + tg\varphi_2$$
$$+ \cos \delta + \cos \delta + tg\varphi_3 + \cos \delta + tg\varphi_3 + tg\varphi_4$$
$$= \frac{s}{2}.(3 \cos \alpha + 2tg\varphi_1 + tg\varphi_2 + 3 \cos \delta + 2tg\varphi_3 + tg\varphi_4)$$

For the same reason, the cosine may be converted to the tangent approximately as follows:

$$\cos \alpha + \cos \delta = tg (90 - \alpha) + tg (90 - \delta) = tg\varphi$$

i.e.:

$$\alpha = \delta = 88°$$
$$\cos \alpha + \cos \delta = \cos 88° + \cos 88° = 0.03490 + 0.03490$$
$$= 0.06984$$
$$tg(90 - \alpha) + tg(90 - \delta) = tg(90° - 88°) + tg(90° - 88°)$$
$$= 0.03492 + 0.03492$$
$$= 0.06984$$

The total error is only 0.6 per thousand.

Thus, to facilitate the measurement of the angles, the following equation may be used:

$$f = \frac{s}{2} \cdot (3tg\psi + 2tg\varphi_1 + tg\varphi^2 + tg\varphi_3 + tg\varphi_4)$$

Thus, the height of the arc is a function of the tangents of the angles enclosed by the chords $s$.

Measurement of the tangents of the angles is obtained by the method illustrated in FIG. 5. As shown, one of the chordal elements 8 is extended beyond the common reference point 10 between adjacent chords 8 and 9. The extension $d$ of chordal element 8 leads to point 11 whence a perpendicular line $e$ is drawn to a point 12 on chord 9 and distance $e$ corresponds to $d \tan \varphi$.

To obtain greater accuracy and to be able to use the measured parameters directly for the control of a track alignment machine, the distances $e$ are preferably measured electrically. Since the angles to be measured are very small, known electrical devices used for measuring oscillations may be used in this connection, for instance electrical resistance devices with sliding contacts, induction coils, piezo-electric devices, slidable and rotatable condensers and the like.

FIG. 6 illustrates schematically an apparatus for carrying out the indicated method. A plurality of axles 14 are mounted on wheels 14a for mobility on rails 13 of a curved track section. The axles are equidistantly spaced and coupled together by rods 15 at pivot points 20. The successive measuring axles are designated by $M_1$, $M_2$, $M_3$ ... $M_7$ and each coupling rod 15 extends from one pivot point 20 to beyond the next piovt point to a free end $m$. A suitable, preferably electrical, measuring device (not shown) is mounted at the free end $m$ of each coupling rod to measure the tangent of the angle enclosed by the extension and the adjacent rod 15.

Since the outer rail 13 determines the direction of the track, the arrangement must be such that the angle or tangent may be measured at either rail, depending on the direction of the curve, the measurement taking place partly at one and partly at the other rail in S-shaped curves.

FIG. 6 also schematically indicates the arrangement of the track alignment machine 16 which aligns the track at a point ahead of the center line 17—17 of the arc.

Many variations and modifications of the method and apparatus may occur to the skilled in the art, particularly after benefitting from the present teaching, without departing from the spirit and scope of the present invention as defined in the appended claims. In particular, the manner of measuring the angles or tangents between the chords may be effected in any desired way.

We claim:

1. An apparatus for measuring the height of the arc of a track section, comprising a plurality of spaced axles with wheels for mobility on the track, means for coupling the axles to each other, a reference point on each of said axles, straight connecting elements between reference points of adjacent ones of said axles constituting chordal elements, and means for measuring the angles enclosed by adjacent ones of said chordal elements.

2. An apparatus for measuring the height of the arc of a track section, comprising a plurality of spaced axles with wheels for mobility on the track, coupling rods pivotally connected between adjacent ones of said axles, each coupling rod extending from a pivoting point on one of said axles to beyond a pivoting point on the adjacent one of said axles, and means for measuring the angle enclosed by the portions of the coupling rods extending beyond the pivoting points and the adjacent coupling rods.

References Cited in the file of this patent

UNITED STATES PATENTS

| | | |
|---|---|---|
| 1,127,204 | Dobyns | Feb. 2, 1915 |
| 2,531,461 | Petry | Nov. 28, 1950 |
| 2,814,119 | Grossman | Nov. 26, 1957 |
| 2,859,528 | Grossman | Nov. 11, 1958 |
| 2,962,979 | McCormick | Dec. 6, 1960 |

FOREIGN PATENTS

| | | |
|---|---|---|
| 657,880 | France | Jan. 21, 1929 |

OTHER REFERENCES

Publication: Civil Engineers Reference Book, J. C. Trantwine, pp. 875, 876, 880, 882, 883, 892, published by Chapman and Hall, London (see Lib. Call No. TA 151 T77, 1937).

Publication: Surveying Theory and Practice, J. C. Tracy, p. 544, published by John Wiley, 1947 (see Library Call No. TA 545 T 76).

UNITED STATES PATENT OFFICE

CERTIFICATE OF CORRECTION

Patent No. 3,126,633            March 31, 1964

Franz Plasser et al.

It is hereby certified that error appears in the above numbered patent requiring correction and that the said Letters Patent should read as corrected below.

In the heading to the printed specification, between lines 8 and 9, insert the following:

Claims priority, application Austria May 29, 1959

Signed and sealed this 14th day of July 1964.

(SEAL)

Attest:

ESTON G. JOHNSON
Attesting Officer

EDWARD J. BRENNER
Commissioner of Patents